United States Patent
Isson

(10) Patent No.: US 7,280,552 B2
(45) Date of Patent: Oct. 9, 2007

(54) MC/CDMA DATA TRANSMISSION METHOD

(75) Inventor: Olivier Isson, La Tronche (FR)

(73) Assignee: STMicroelectonics S.A., Montrouge (FR)

( * ) Notice: Subject to any disclaimer, the term of this patent is extended or adjusted under 35 U.S.C. 154(b) by 1022 days.

(21) Appl. No.: 10/163,087

(22) Filed: Jun. 5, 2002

(65) Prior Publication Data

US 2002/0191581 A1   Dec. 19, 2002

(30) Foreign Application Priority Data

Jun. 6, 2001  (FR) .................................. 01 07395

(51) Int. Cl.
  *H04B 7/216* (2006.01)
(52) U.S. Cl. ................... 370/441; 370/203; 370/208
(58) Field of Classification Search ............... None
  See application file for complete search history.

(56) References Cited

U.S. PATENT DOCUMENTS

| | | | |
|---|---|---|---|
| 6,373,891 B1 * | 4/2002 | Schulze ................ | 375/240.01 |
| 6,442,214 B1 * | 8/2002 | Boleskei et al. ............ | 375/299 |
| 6,661,771 B1 * | 12/2003 | Cupo et al. ................ | 370/204 |
| 6,842,487 B1 * | 1/2005 | Larsson ...................... | 375/260 |
| 7,110,387 B1 * | 9/2006 | Kim et al. .................. | 370/344 |

FOREIGN PATENT DOCUMENTS

| EP | 1 085 689 A1 | 3/2001 |
|---|---|---|
| WO | WO95/17046 A1 | 6/1995 |
| WO | WO99 43123 A1 | 8/1999 |

OTHER PUBLICATIONS

European Search Report from European patent application No. 02354092.
French Search Report from French Patent Application No. 01/07395, filed Jun. 6, 2001.
Harada H. et al., "A New Multi-Carrier CDMA/TDD Transmission Scheme Based On Cyclic Extended Spread Code For 4th Generation Mobile Communication System", Personal Wireless Communications, Dec. 17-19, 1997, pp. 319-323, IEEE, New York, US; ISBN: 0-7803-4298-4.

* cited by examiner

*Primary Examiner*—Bob A. Phunkulh
(74) *Attorney, Agent, or Firm*—Lisa K. Jorgenson; James H. Morris; Wolf, Greenfield & Sacks, P.C.

(57) ABSTRACT

A method for MC-CDMA transmission of data between nodes of a network, including assigning to each node at least one spreading matrix, a set of data of at least one datum to be transmitted by a node being multiplied by the spreading matrix which is associated therewith and the product being then transmitted on a group of carriers in at least one predetermined set of samples forming at least one OFDM symbol; forming symbols to be transmitted all having the same duration, whatever the transmit node; and adding to each transmitted symbol a cyclic prefix and a cyclic suffix representing a predetermined number of samples, respectively of the end and of the beginning of the symbol.

20 Claims, 3 Drawing Sheets

MC/CDMA DATA TRANSMISSION METHOD

BACKGROUND OF THE INVENTION

1. Field of the Invention

The present invention relates to the field of shared multipoint-to-multipoint communication networks. The present invention will be described hereafter in relation with an example of application to networks using the electric supply conductors (for example, the mains) as a transmission medium. High-frequency carriers which are modulated to transmit data between two or several devices equipped with modems and connected to the mains are generally used. Such networks may be used, for example, to connect a microcomputer to its peripherals (printer, scanner, etc.). They may also distribute, inside of a home, an office, or the like, multimedia data coming from a connection to an external access, for example, a satellite antenna, an optical fiber cable, a modem cable, an XDSL modem, etc.

2. Discussion of the Related Art

Since various devices may simultaneously need to transmit information over the shared network, an access control mechanism of the transmission means (MAC) is necessary to avoid collisions which would result in information losses. Further, since different multimedia services or transmission types are likely to use the same electric supply conductors and since these different transmissions most often have distinct constraints in terms of delay, bit error rate, etc., an access priority management mechanism more generally designated as a quality-of-service control (QOS) is generally used.

FIG. 1 very schematically shows an exemplary architecture of a transmission network using electric supply conductors L as a transmission medium. The electric supply network connects different taps P together, possibly via an electric board provided with circuit breakers or the like (not shown). Taps P have been symbolized in FIG. 1 as being taps with three conductors (phase, neutral, and ground). However, these also may be taps only having two conductors (phase and neutral). From the point of view of the transmission network, each tap is considered as a node. Six nodes N1, N2, N3, N4, N5, and N6 are shown in FIG. 1.

Among the various electric devices connected to the network, devices 1 of a first type equipped with a modem Mk (k ranging between 1 and 4 in the illustrated example) are respectively connected to nodes Nk to communicate over the network. In the example of FIG. 1, a modem-free device 2 is connected on one of the taps. Device 2 is only supplied by the electric network.

Most often, each device 1 of the first type connected to any tap from the point of view of the electric supply (node from the point of view of the network) should be able to send and receive data. The network accordingly is a so-called point-to-multipoint or multipoint-to-multipoint network.

The data transmission protocols over shared networks can be grouped in three large categories. A first category concerns time-division multiple accesses (TDMA or TDD), which assign different time slots to each transmission. A second category concerns frequency-division multiple accesses (FDMA or FDD), which assign one or several frequencies to each transmission. A third category concerns code-division multiple accesses (CDMA) and multicarrier code-division multiple accesses (MC-CDMA) which assign, for each transmission, different codes, also called spreading sequences or matrixes.

All these transmission systems are generally used in multipoint-to-point systems such as, for example, GSM mobile telephony communication systems. They however all have disadvantages in the point-to-multipoint or multipoint-to-multipoint communication systems to which the present invention applies.

For time-division transmissions, significant dead times must be provided between each data sequence sent by each device. These dead times must be inserted to avoid collisions between packets transmitted by different nodes, while taking account of all possible reflections and multiple paths between the transmitter and the receiver. This disadvantage can significantly reduce the network capacity due to the decrease in general transmission rate.

For frequency-division multiple accesses, analog filters are required to separate the frequencies or frequency groups used for the transmit and receive sections of the modems. This makes the system less flexible and less adaptable in frequency since the analog filters which are formed cannot be modified according to the dynamic capacity needs or any other reason requiring modification of the assigned frequencies. This is a significant disadvantage, especially in the case of a network using the power conductors as a transmission support. Indeed, the transfer function of such a network considerably varies along time (for example, upon plugging of an electric device, be it or not equipped with a modem) and from one node to another.

For simple code-division transmissions (CDMA), that is, single-carrier transmissions, flow rate limitations on the order of a few hundreds of kilobits per second (at most, a few megabits per second) are observed in practice due to the complexity of managing the multiple users which causes a lot of interference, and to the level differences of the received signal according to the paths to be followed by the different signals. The implementation of an efficient code-division system requires significant means, which can quickly reach a prohibitive cost. Further, the spectral density of a code-division transmission extends over the entire usable bandwidth, which makes this type of transmission incompatible with electromagnetic compatibility requirements, which require being able to forbid transmissions in certain specific frequency bands.

The present invention mode specifically relates to a multicarrier code-division transmission (MC-CDMA) which, with current techniques, remains unadapted to point-to-multipoint or multipoint-to-multipoint transmissions.

FIG. 2 shows a synoptic diagram illustrating a simplified case of operation of an MC-CDMA coding and modulation means 4. This simplified case assumes the transmission of a single datum $d^{(k)}(n)$, where n represents the time rank of the datum in the data flow to be transmitted, spread over N carriers by the modem of a k-th user of a network. It is also assumed, as an example and to simplify, that the transmission channel is perfect (its frequency response is ideal). Datum $d^{(k)}(n)$ is provided to a number N of multipliers 6. Each multiplier 6 is provided to multiply datum $d^{(k)}(n)$ with an element $c^{(k)}(m)$ of a sequence, called a spreading sequence, m ranging between 0 and N−1. The output of each multiplier 6 is provided to a corresponding modulator 8 to be modulated on a carrier at frequency (fc+m.F/Tb). fc is the first frequency of a group of frequencies or carriers of the multicarrier modulation. F/Tb is the interval between two consecutive carriers, F being an integer chosen according to the sampling frequency and to the frequency band used by signal OFDM (orthogonal frequency-division multiplexing) and Tb being the duration of datum $d^{(k)}(n)$, except for a guard interval. All carriers are added in an adder 10 to form an OFDM symbol, or time signal, $S^{(k)}(n, t)$. Symbol $S^{(k)}(n, t)$ is a digital signal formed of a sequence of samples. It should be noted that, in this specific example, modulators 8 and adder 10 may altogether be implemented by an inverse Fourier transform (IFFT). The spreading sequences assigned to the network nodes are chosen to be orthogonal to one another, that is, so that the sum of the products of the elements of same rank of any two spreading sequences of different nodes is zero. This amounts to respecting the following formulas 1 and 2 where 1 and p are integers ranging between 1 and the maximum number TN of nodes:

$$\sum_{m=0}^{N-1} c^{(1)}(m) \cdot c^{(p)}(m) = 1 \text{ (after normalization)} \quad (1)$$

if 1 is equal to p; and $$\sum_{m=0}^{N-1} c^{(1)}(m) \cdot c^{(p)}(m) = 0, \quad (2)$$

if 1 is different from p.

The network receives the sum of all symbols $S^{(i)}(n, t)$ transmitted by each node i.

To receive the preceding datum $d^{(k)}(n)$ from a given node j of the network, the sum of the symbols present on the network is provided to a demodulation and decoding means (not shown). First, the sum of the symbols is demodulated for each carrier m. It should be noted that the demodulation can be implemented by a fast Fourier transform (FFT). The result of the demodulation for carrier m is substantially equal to sum:

$$\sum_{i=0}^{TN} d^{(i)}(n) \cdot c^{(i)}(m) \quad (3)$$

of data $d^{(i)}(n)$ transmitted by each node i is, each weighted by coefficient $c^{(i)}(m)$ corresponding to carrier m in the spreading sequence assigned to node i. The result of each demodulation is then multiplied by the corresponding coefficient $c^{(k)}(m)$ of the spreading sequence assigned to node k, the data of which are desired to be received. The products obtained for each carrier m are added. This provides:

$$\sum_{m=0}^{N-1} \left( c^{(k)}(m) \cdot \sum_{i=0}^{TN} d^{(i)}(n) \cdot c^{(i)}(m) \right) \quad (4)$$

Datum $d^{(i)}(n)$ transmitted by each node i is the factor of a term:

$$\sum_{m=0}^{N-1} c^{(k)}(m) \cdot c^{(i)}(m), \quad (5)$$

Due to the orthogonality of the spreading sequences, only datum $d^{(k)}(n)$ transmitted by node k (i=k) is, in node j, the factor of a non-zero term.

More generally, a group of K data $d^{(i)}(nK)$ to $d(i)((n+1)K-1)$ is spread over the N carriers by a multiplication by a spreading matrix with N lines and K columns. In the above example (FIG. 2), the spreading matrix is a single column (formed by column vector $c^{(k)}(0), \ldots, c^{(k)}(N-1)$), all transposed. The coefficients of the spreading matrix are thus a function of the communication to be established. More specifically, the coefficients of the decoding matrix used in receive mode by a given modem must be a function (for example, equal, in the case of real codes) of those of the spreading matrix used in transmit mode by the node from which data are desired to be received.

In such a multicarrier transmission, the propagation delays of the signals on the network and their reflections especially create an interference between the transmitted symbols $S^{(i)}(n, t)$. Such an interference may disturb or prevent the signal reception by the network nodes.

Standards relative to the networks using the power system as a transmission support conventionally provide a frequency-division multiple access performed by using an orthogonal frequency-division multiplexing (OFDM). For example, article "HomePlug Standard Brings Networking to the Home" by Steve Gardner, Brian Markwalter, and Larry Yonge, published in December 2000 in Communication Systems Design, which is incorporated herein by reference, discusses the application of such a multiplexing to networks using electric power cables as a transmission support. A significant disadvantage of an OFDM multiplexing in such a network, however, is that the turning-on of some devices powered by the network (for example, using an electric motor) may cause significant noise on a specific frequency band. If this specific frequency band encroaches upon a frequency band assigned for a data transmission, this transmission can no longer occur.

SUMMARY OF THE INVENTION

The present invention aims at providing a novel data transmission technique adapted to networks using the power system as a transmission medium.

The present invention aims at providing a multicarrier code-division transmission technique (MC-CDMA) adapted to such networks.

The present invention also aims at enabling all modems connected to the network to operate without it being necessary to manage, in a specific way, the assignment of the spreading matrixes to the network nodes.

The present invention further aims at eliminating dead times in transmissions.

To achieve these and other objects, the present invention provides a MC-CDMA method for transmitting data between nodes of a network, comprising the steps of:

assigning to each node at least one spreading matrix, a set of data of at least one datum to be transmitted by a node being multiplied by the spreading matrix which is associated therewith and the product being then transmitted on a group of carriers in at least one predetermined set of samples forming at least one OFDM symbol;

forming symbols to be transmitted all having the same duration, whatever the transmit node; and adding to each transmitted symbol a cyclic prefix and a cyclic suffix representing a predetermined number of samples, respectively, of the end and of the beginning of the symbol.

According to an embodiment of the present invention, the spreading matrixes assigned to the nodes are different from one another, a single group of carriers being used.

According to an embodiment of the present invention, the spreading matrixes assigned to two nodes communicating together are identical.

According to an embodiment of the present invention, two different groups of carriers are respectively used for the data transmission from each of said two nodes.

According to an embodiment of the present invention, a single group of carriers is used for the transmission and the reception of the data of a same node, a signal depending on the data transmitted by a given node being subtracted to the data received by this same node.

According to an embodiment of the present invention, said signal depending on the transmitted data is an estimate of the reflection, to a given node, of the data that this node transmits over the network.

According to an embodiment of the present invention, the times of symbol transmission beginning from all nodes are synchronized.

According to an embodiment of the present invention, the symbols to be transmitted are shaped to avoid intercarrier interference.

The present invention also provides a MC-CDMA device for transmitting data intended to be connected to a node of a network, including:

means for multiplying a data set to be transmitted of at least one datum from said node by a spreading matrix, then transmitting the product on a group of carriers in a predetermined set of samples, or symbol; and means for adding to each transmitted symbol a cyclic prefix and a cyclic suffix representing a predetermined number of samples, respectively, of the end and of the beginning of the symbol.

The present invention also provides a device intended to be connected to a first node of a network to transmit to a second network node data in the form of symbols adapted to a code-division multiplexing, including:

means for determining at least one code, distinct from the codes used for communication between other pairs of network nodes, means for transmitting data to the second node by using a first group of frequencies, and means for receiving the data transmitted from the second node to the first one by using a second group of frequencies;

means for adding to each transmitted symbol a cyclic prefix and a cyclic suffix representing a predetermined number of samples, respectively of the end and of the beginning of the symbol; and means for synchronizing the transmission beginning times of the symbols from all nodes.

The foregoing objects, features and advantages of the present invention will be discussed in detail in the following non-limiting description of specific embodiments in connection with the accompanying drawings.

DETAILED DESCRIPTION

Figure 1:
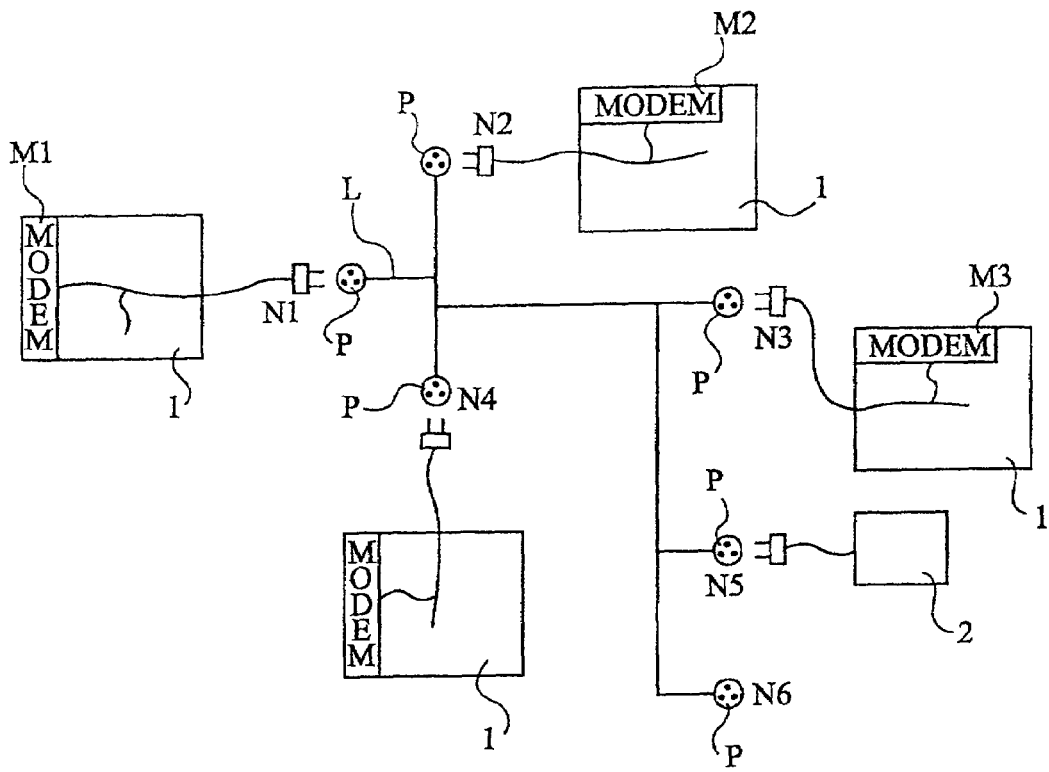
FIG. 1, previously described, very schematically shows a network using the electric supply lines as a transmission medium.

The same elements have been designated with the same references in the different drawings. For clarity, only those elements and those steps of the method which are useful to the understanding of the present invention have been shown in the drawings and will be described hereafter. In particular, the data to be transmitted and their possible coding have not been detailed. The data to be transmitted and the possible coding of these data as well as their transmission protocols depend on the applications, and the present invention may be implemented whatever these types of data and transmission protocols. Further, the access control mechanisms and other mechanisms necessary to the network operation (for example, priority management, etc.) have not been detailed. The possible adaptation of these mechanisms to implement the present invention makes use of well known techniques within the abilities of those skilled in the art.

According to the present invention, each network node is assigned a spreading matrix adapted to an MC-CDMA transmission. The spreading matrix of at least one column is used to code the transmitted data. The reception of the data transmitted from a node is performed by using the spreading matrix assigned to this node. The spreading matrix assignments are managed by the network access control mechanism.

A feature of the present invention is to provide a cyclic prefix and suffix for each transmitted OFDM symbol. This amounts, in the time field and upon transmission of each symbol, to reproducing a predetermined number of samples, respectively of the end and of the beginning of the symbol, and to inserting these copies at the beginning and at the end of the symbol to fill the inter-symbol intervals. The number of samples copied (or the duration of the prefixes and suffixes) is the same for all transmission flows, but the prefixes may have durations different from those of the suffixes.

The cyclic prefix of each symbol amounts, in the time field, to providing a replica of the last few microseconds of the symbol which is copied before the symbol, in the dead time separating two symbols. The function of the cyclic prefix is to absorb the inter-symbol interference which results from the fact that the delay of a channel is not constant with frequency (that is, the pulsed response of the transmission channel).

The use of a cyclic prefix, applied to the symbols of an orthogonal frequency-division multiplexing (OFDM) in a network using the mains as a transmission medium is known from above-mentioned article "HomePlug Standard Brings Networking to the Home".

The prefix and the suffix provided by the present invention are used to reduce or eliminate the interference due to the delays introduced by the network between the data transmitted by the various network users. Indeed, by repeating part of the data at the beginning and at the end of a symbol, discontinuities upon reception of different symbols simultaneously received by different nodes are avoided. Such discontinuities translate, on the receive side upon fast Fourier transform, by noise extending over the adjacent frequencies. This noise modifies the result of the fast Fourier transform and alters the orthogonality introduced between the data of the different users by the spreading matrixes. Since, according to the present invention, dead times between symbols are filled in the time field by the repeated data and the operation of a fast Fourier transform is cyclic, the point at which a symbol starts being taken into account can vary within the interval containing the signal, that is, the symbol duration plus the prefixes and suffixes, without any information being lost. This amounts to saying that the coded data obtained by fast Fourier transform of the symbols having a prefix and a suffix remain orthogonal to one another. The orthogonality is kept since each time window chosen by a user in receive mode only contains OFDM symbols of same time rank (provided that the cyclic extensions, that is, the prefix and suffix, cover all reflections and all paths). Accordingly, each disturbance (symbols which are not desired to be received on a given modem) is only present once in the window. The fact of providing both a prefix and a suffix thus enables a receiver modem to receive with no interference the data transmitted with a specific spreading matrix.

Figure 3:
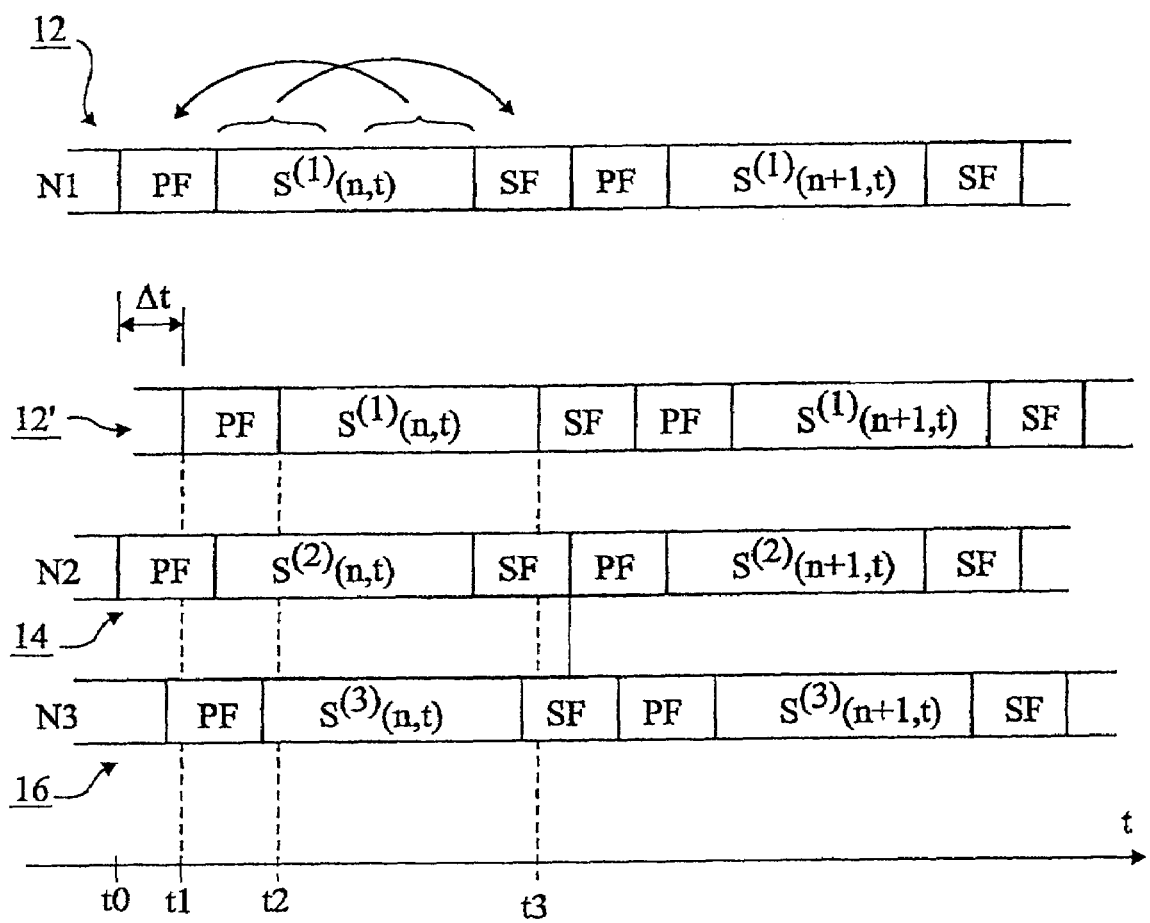
FIG. 3 illustrates, in the form of timing diagrams, an embodiment of the present invention.

FIG. 3 illustrates, in simplified timing diagrams, a mode of implementation of the present invention.

A data transmission flow 12, transmitted from node N1 at a time t0, is assumed. This flow successively contains symbols $S^{(1)}(n, t)$, $S^{(1)}(n+1, t)$. Each symbol is separated from the preceding or following symbol by a segment in which is copied a portion of each of the neighboring symbols. In practice and according to the present invention, each symbol is preceded with a prefix PF reproducing a time interval corresponding to the end of the symbol, and is followed with a suffix SF corresponding to a copying of the symbol beginning.

The data transmitted by node N1 are desired to be received at the level of node N2 of the network. Flow 12 undergoes, for example, a delay Δt before reaching node N2 at a time t1 in the form of a flow 12'. In the time field, other flows interfere on node N2. This interference may come from other paths followed by transmitted flow 12 which are conventionally eliminated by equalization.

Figure 2:
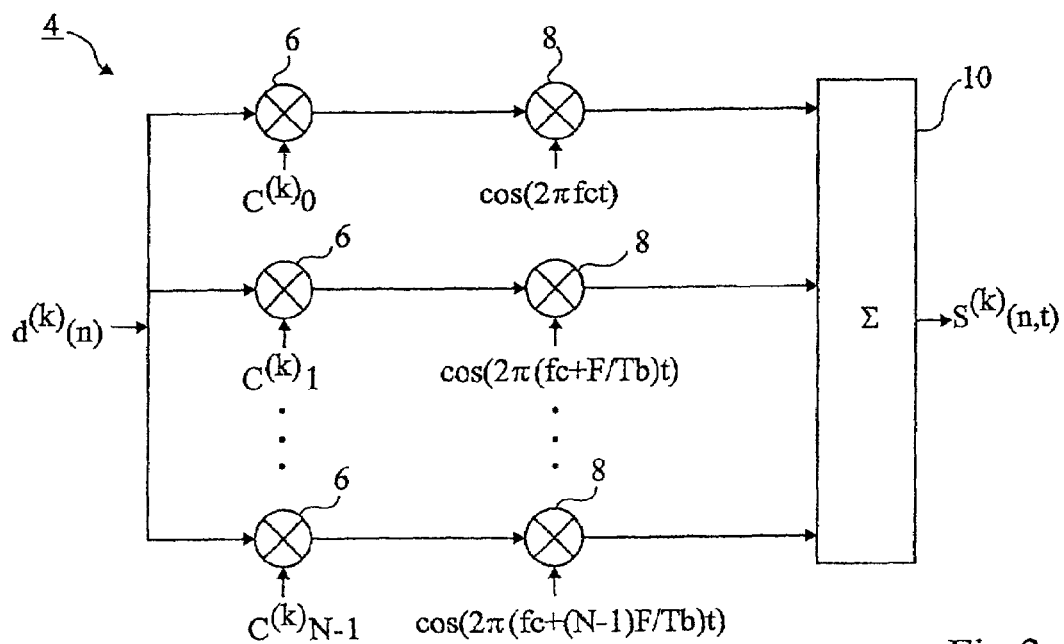
FIG. 2, previously described, schematically illustrates the operation of an MC-CDMA transmission.

Other interferences are formed by the symbol flows transmitted by other network nodes. In the example of FIG. 2, two flows 14 and 16 respectively corresponding to the transmissions from nodes N2 and N3 have been shown. The structure of each data flow is the same as that discussed for flow 12, and includes both a prefix PF and a suffix SF associated with each symbol. Of course, multiple reflections of flow 14 also reach node N2, as well as multiple-path interference from node N3.

The spreading matrixes with which flows 14 and 16 have been generated are different from each other and different from the spreading matrix with which flow 12 has been generated. Accordingly, on the side of node N2, the data coded by means of a decoding matrix depending on the spreading matrix of node N1 can easily be accepted. The receive window is included between times t2 and t3 between which only the symbols of same rank (n) are present. Time interval t2–t3 corresponds to the receive window of node N2 to receive data from node N1. The window determination is performed in a conventional initialization step (time synchronization) at the beginning of each communication and can be adapted (set back in phase) during communication.

It should be noted that, once back in the frequency field (after the fast Fourier transform), the fact that the recovered modulated data come from the symbol or from the SF suffix has no further importance.

A significant advantage of the present invention is that the data transmitted by each node are coded over all the carriers available on the network. Thereby, the introduction of a high noise on one frequency band only (for example, consecutive to the turning-on of a device supplied by the network) causes a low noise over all the data transmitted by each node of the network, which enables performing all the transmissions in satisfactory conditions.

According to the present invention, the length of the cyclic suffix is chosen according to the network propagation delays.

It should however be noted that, to implement the present invention, all symbols should have the same length (duration Tb).

According to a first embodiment, each transmitter of the network starts transmitting as soon as it receives a symbol. In this case, the suffix duration corresponds to twice the maximum propagation time in the network, taking into account all possible reflections and paths (multiple-paths).

According to another preferred embodiment, corresponding to the illustration of FIG. 3, the transmission of the different modems is synchronized so that all modems connected to the network nodes transmit at the same time. In this case, the cyclic suffix duration may advantageously be limited to once the maximum propagation time in the network, still taking into account all possible reflections and multiple-paths.

According to another embodiment, use of a synchronization of the transmissions is avoided by shaping the symbols to be transmitted to avoid, upon reception on a same node, intercarrier interference of several symbols transmitted by different nodes. Such a shaping technique is well known in other fields of application such as, for example, the reception of video signals or telephony, and is described, for example, in article "Zipper VDSL: A Solution for Robust Duplex Communication over Telephone Lines" by Denis J. G. Mestdagh, Michael R. Isaksson, and Per Odling, published in May 2000 in IEEE Communication Magazine, pages 90 to 96, which is incorporated herein by reference.

Conventionally, to avoid use of complex equalizers in receive mode and to avoid intersymbol interference, the duration of the cyclic prefixes is greater than (at least equal to) the pulsed response of the transmission network.

The possible synchronization of the network nodes may be performed independently. For example, a signaling channel which conveys a reference time signal of the network may be used. It is assumed that all modems are plugged on mains connection taps. Upon tuning-on of one of the modems, said modem permanently sends a specific signal formed of predefined data, for example over a predefined signaling frequency set. Upon reception by another turned-on modem, the latter immediately sends back a response signal, for example on another predefined signaling frequency. When the first modem receives the response, it can calculate the duration, which then becomes the propagation duration that it sends back. Upon reception of the content of this channel, the second modem now knows the duration to be applied for a transmission to its own signals, so that the two above-mentioned modems are now capable of transmitting signals at the same time.

During this initialization phase, collisions may occur if another modem performs the same operation as the second one. This problem can be solved by providing random mechanisms which include, when a collision occurs, placing each node in a waiting mode for a duration determined by a random generator. This random generator subsequently allows the involved modem to restart some initialization cycles again.

To limit the number of spreading matrixes used, it is also possible, according to an alternative of the present invention, to assign two identical spreading matrixes to two nodes communicating together. In this case, however, the modem of each of the two nodes simultaneously receives the data transmitted by the other node as well as the reflection of the data that it has itself transmitted, coded with the same spreading matrix. This reflection of the data transmitted by the node itself may in particular be due to a variation in the input impedance of the network, as seen from the node. Such a phenomenon is known as the close echo.

With no echo canceler, either different frequencies for the rising and falling edges must be used, or different spreading matrixes for the rising and falling directions must be used, which amounts, as previously described, to using different spreading matrixes for each node.

Figure 4:
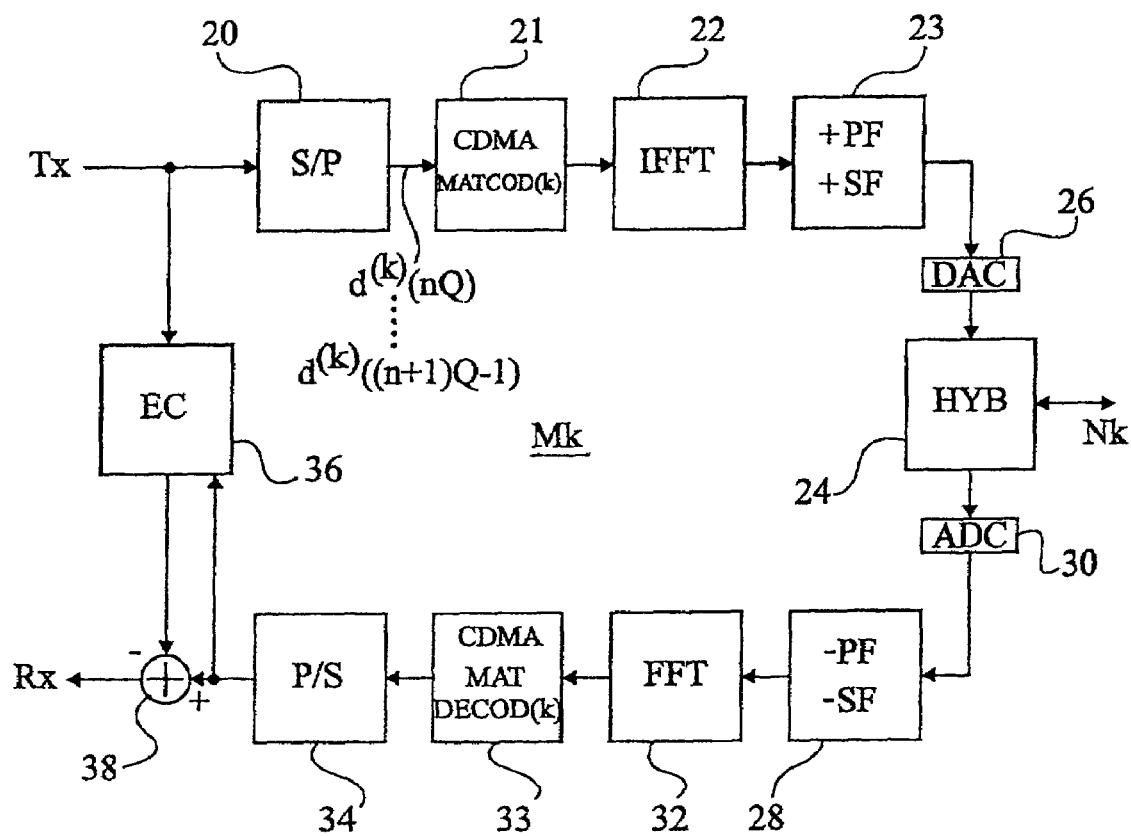
FIG. 4 shows a modem intended to implement an alternative of the present invention.

FIG. 4 shows a modem Mk intended to implement such an alternative of the present invention, provided with a close echo canceler. Modem Mk, connected to a node Nk of the network, includes a series-to-parallel conversion means (S/P) 20 receiving in series the data Tx to be transmitted and generating as an output a corresponding series of parallel data $d^{(k)}(nK)$ to $d^{(k)}((n+1)K-1)$. The output of means 20 is connected to a coding and modulation means 4 of the type described by generalizing FIG. 2. This means is here symbolized in the form of a block 21 (CDMA MATCOD(k)) of coding by the spreading matrix of node k. The coefficients of spreading matrix MATCOD(k) of node k upon transmission are determined (and possibly adapted during communication) by conventional means (not shown). The output of block 21 is sent onto an inverse Fourier transform circuit (block 22, IFFT). The output of circuit 22 is connected to a prefix and suffix adding means 23 (+PF+SF). The output of means 23 is connected to an input of a hybrid 24 (HYB) of separation of the rising/falling (or input/output) data via a digital-to-analog converter 26 (DAC). An input/output terminal of hybrid 24 is connected to node Nk. An output terminal of hybrid 24 is connected to a prefix and suffix suppression means 28 (−PF−SF) via an analog-to-digital converter 30 (ADC). The output of means 28 is connected to a fast Fourier transform circuit (FFT) 32 having its output connected to a circuit 33 (CDMA MATDECOD(k)) of decoding by a matrix adapted according to the established communication. In the embodiment of FIG. 4, the same coefficients are assigned to two communicating nodes. Accordingly, the decoding matrixes of the two considered nodes are functions of the same spreading or coding matrix MATCOD(k). More generally, the coefficients of the decoding matrix are determined by conventional means according to the transmitted node from which data are desired to be received. The output of means 33 is connected to a parallel-to-series conversion means 34 (P/S). Referring to the example of FIG. 2, converters 20 and 34 would have no reason for being (a single datum).

A close echo canceler 36 has an input connected to the input of means 20 and an input connected to the output of means 34. A subtractor 38 is connected to subtract an output of canceler 36 to the output of means 34. The subtractor is interposed between converter 34 and the circuits (not shown) for processing the received demodulated signals Rx.

In a learning phase, while hybrid 24 receives no symbol, a calibrating symbol is provided thereto by transmit means 20, 21, 22, 23, 26. The data generated as a response by receive means 30, 28, 32, 33, 34 enable echo canceler 36 to evaluate the transfer function which enables obtaining the close echo signal from data provided as an input of means 20. Once this transfer function is known, the echo canceler is operational and the modem can operate.

The use of cyclic extensions enables, according to the present invention, using an echo canceler acting upon the (frequency) data upstream (transmission) and downstream (reception) of the Fourier transforms. Without these extensions, the time field, that is, information present on the other side of the Fourier transforms, would have to be taken into account. The present invention thus enables simplifying the echo canceler.

Of course, the present invention is likely to have various alterations, modifications, and improvements which will readily occur to those skilled in the art. In particular, the implementation of the transmission method of the present invention is within the abilities of those skilled in the art based on the functional indications given hereabove. Further, although the present invention has been described in more specific relation with a network using the power cables as a transmission medium, the present invention may also apply to any other point-to-multipoint or multipoint-to-multipoint network in which similar problems are posed. As an example, applications to wireless communications in which the problems of the variation of the transfer function along time are posed, and which are multiple-path and multiple-reflection communications, will be mentioned.

Finally, although reference has sometimes been made to the use of groups of different carriers (for example, in transmit and receive mode), this amounts, in practice, to providing 0s in the spreading matrix for all the carriers on which symbols must not be transmitted, the circuits and especially the Fourier transform circuit being preferably provided to process all the carriers of the possible different groups. Generally, the present invention applies whatever the type of coding performed, the number of data and the number of carriers. In particular, the number of carriers may be smaller than the number of coefficients per columns of the spreading matrixes. In this case, a same set of data will be transmitted over several successive OFDM symbols.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of transmitting MC-CDMA data between nodes of a network, comprising the steps of:
   assigning to each node at least one spreading matrix, a set of data of at least one datum to be transmitted by a node being multiplied by the spreading matrix which is associated therewith and the product being then transmitted on a group of carriers in at least one predetermined set of samples forming at least one OFDM symbol;
   forming symbols to be transmitted all having the same duration, whatever the transmit node;
   adding to each transmitted symbol a cyclic prefix and a cyclic suffix representing a predetermined number of samples, respectively, of the end and of the beginning of the symbol; and
   synchronizing the times of symbol transmission beginning from all nodes.

2. The method of claim 1, wherein the spreading matrixes assigned to the nodes are different from one another, a single group of carriers being used.

3. The method of claim 1, wherein the spreading matrixes assigned to two nodes communicating together are identical.

4. The method of claim 3, wherein two different groups of carriers are respectively used for the data transmission from each of said two nodes.

5. The method of claim 3, wherein a single group of carriers is used for the transmission and the reception of the data of a same node, a signal depending on the data transmitted by a given node being subtracted to the data received by this same node.

6. The method of claim 5, wherein said signal depending on the transmitted data is an estimate of the reflection, to a given node, of the data that this node transmits over the network.

7. The method of claim 1, comprising shaping the symbols to be transmitted to avoid intercarrier interference.

8. A device for MC-CDMA transmission, intended to be connected to a node of a network, including:
    means for multiplying a data set to be transmitted of at least one datum from said node by a spreading matrix, then transmitting the product on a group of carriers in a predetermined set of samples, or symbol;
    means for adding to each transmitted symbol a cyclic prefix and a cyclic suffix representing a predetermined number of samples, respectively of the end and of the beginning of the symbol; and
    means for synchronizing the transmission beginning times of the symbols from all nodes.

9. A device intended to be connected to a first node of a network to transmit to a second network node data in the form of symbols adapted to a code-division multiplexing, including:
    means for determining at least one code, distinct from the codes used for communication between other pairs of network nodes, means for transmitting data to the second node by using a first group of frequencies, and means for receiving the data transmitted from the second node to the first one by using a second group of frequencies;
    means for adding to each transmitted symbol a cyclic prefix and a cyclic suffix representing a predetermined number of samples, respectively, of the end and of the beginning of the symbol; and
    means for synchronizing the transmission beginning times of the symbols from all nodes.

10. A method of conditioning data for transmission on a network having a plurality of nodes, the method comprising:
    forming at least one symbol representing data, the at least one symbol comprising a beginning and an end; and
    modulating at least one carrier with the at least one symbol, a cyclic prefix, and a cyclic suffix;
    wherein the cyclic prefix represents a predetermined number of samples of the end of the at least one symbol and the cyclic suffix represents a predetermined number of samples of the beginning of the at least one symbol;
    synchronizing times of symbol transmissions originating from all nodes of the network.

11. The method of claim 10, further comprising multiplying a set of data by a spreading matrix to form a product, wherein the at least one symbol comprises the product.

12. The method of claim 11, wherein the spreading matrix is associated with a node of the plurality of nodes, the spreading matrix of each node of the plurality of nodes being unique.

13. The method of claim 11 wherein the spreading matrix is associated with a node of the plurality of nodes, at least two nodes of the plurality of nodes being associated with an identical spreading matrix.

14. The method of claim 10, wherein the at least one symbol is an OFDM symbol.

15. The method of claim 10, further comprising shaping the at least one symbol to avoid intercarrier interference.

16. A system for data transmission, the system comprising:
    a circuit to form a symbol representing data, the symbol having an end and a beginning; and
    means for adding a cyclic prefix and a cyclic suffix to the symbol, wherein the cyclic prefix represents a predetermined number of samples of the end of the symbol and the cyclic suffix represents a predetermined number of samples of the beginning of the symbol;
    wherein the circuit for forming a symbol comprises a coding and modulation block to receive a parallel set of data and to output the symbol;
    further comprising a serial-to-parallel converter to receive a serial stream of data and to output the parallel set of data;
    further comprising a digital-to-analog converter to receive an output from the means for adding a cyclic prefix and cyclic suffix to the symbol, and to output an analog signal to a hybrid circuit.

17. The system of claim 16, wherein the hybrid circuit comprises an input to receive an output of the digital-to-analog converter, and an output to output a signal to an analog-to-digital converter.

18. The system of claim 17, further comprising means for suppressing the cyclic prefix and cyclic suffix, the means comprising an input to receive a signal from the analog-to-digital converter and comprising an output to output a signal to a fast fourier transform circuit.

19. The system of claim 18, further comprising a decoding and demodulation block to receive an output of the fast fourier transform circuit and to output a signal to a parallel-to-serial converter.

20. The system of claim 19, further comprising an echo canceler to operate on an input of the serial-to-parallel converter and an output of the parallel-to-serial converter.

* * * * *

UNITED STATES PATENT AND TRADEMARK OFFICE
CERTIFICATE OF CORRECTION

PATENT NO. : 7,280,552 B2  Page 1 of 1
APPLICATION NO. : 10/163087
DATED : October 9, 2007
INVENTOR(S) : Olivier Isson It is certified that error appears in the above-identified patent and that said Letters Patent is hereby corrected as shown below:

Title Page
(73) Assignee: STMicroelectronics S.A., Montrouge (FR)

Col. 8, line 29, should read:
Mestdagh, Michael R. Isaksson, and Per Ödling, published line 40, should read:
mains connection taps. Upon turning-on of one of the Signed and Sealed this Fourth Day of December, 2007

JON W. DUDAS
*Director of the United States Patent and Trademark Office*